March 14, 1933.  A. H. FISHER  1,901,231

TIRE CASING REPAIR APPARATUS

Filed July 25, 1927

INVENTOR.
Albert H. Fisher
BY
Fay, Oberlin & Fay
ATTORNEYS.

Patented Mar. 14, 1933

1,901,231

UNITED STATES PATENT OFFICE

ALBERT H. FISHER, OF EAST CLEVELAND, OHIO, ASSIGNOR TO KEX COMPANY, INCORPORATED, OF ST. LOUIS, MISSOURI, A CORPORATION OF MISSOURI

TIRE CASING REPAIR APPARATUS

Application filed July 25, 1927. Serial No. 208,152.

This invention as indicated relates to a tire casing repair apparatus. More particularly it comprises a repair plug of mushroom type having means adapted to be clamped upon the end of the stem thereof to provide a unitary repair apparatus. Heretofore it has been the practice to provide an inserting implement and a plurality of plugs, said implement being adapted to engage the plug stem for inserting the same through an aperture in a tire and thereafter be available to repeat the operation on other plugs. In no instance as far as is known has each individual plug been equipped with an inserting device, notwithstanding the greater effectiveness of such construction as well as the convenience which would be afforded by always having the complete repair unit ready for instant use in sealing the puncture hole through a tire casing.

The present invention has in view the provision of a mushroom-shaped plug equipped with a light inserting terminal secured to the free end of the stem thereof. This construction will enable manufacturers and distributors to sell plugs combined with individual inserting devices as units rather than in large and small kits as is the present practice where from six to fifty plugs are usually supplied with a single inserting tool and the user will have at all times a repair device ready for immediate use without preliminary adjusting or a search for a plug stem of the proper size to fill the aperture and an implement of suitable size to receive the same. The repair units may be sold in various sizes to permit selection of a plug stem suitable for the particular aperture to be closed. To the accomplishment of the forgoing and related ends, said invention, then, consists of the means here inafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
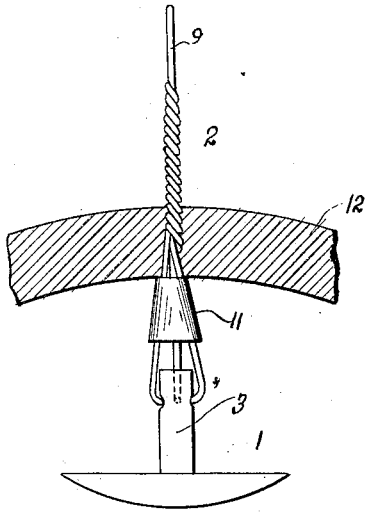
Figure 2:
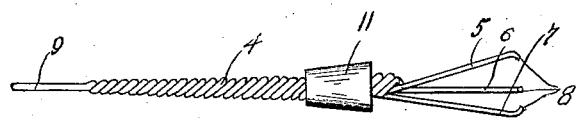
Figure 3:
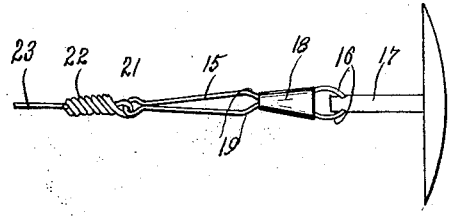

In said annexed drawing:

Fig. 1 is a front elevation showing a plug equipped with an inserting terminal attached to the free end an in the course of insertion through an aperture in a tire casing (shown in section); Fig. 2 is a side elevation of the device shown in Fig. 1 with the prongs of the inserting terminal expanded and the sleeve in non-clamping position; and Fig. 3 is a side elevation of a modified form of construction showing the clamping jaws of the inserting terminal locked in position upon the tip of a plug stem.

In the form of construction illustrated in Figs. 1 and 2, a plug 1 is shown having an inserting terminal 2 applied to the upper end of the stem 3 of a tire repair plug, which terminal is formed of a plurality of wires twisted centrally to form a tapered body portion or shank 4 and projecting beneath said body portion to provide a plurality of prongs or fingers 5, 6, 7, the lower ends of which may be turned inwardly in the form of hooks 8.

One of the twisted wires is somewhat longer than the remaining wires and projects beyond the others a distance sufficient to form a narrow tip portion 9 which may be first inserted through the puncture hole. The extreme end of the wire is preferably rounded so as to pass more readily through the puncture aperture. In order to hold the terminal hooks on the prongs into engagement with the end of the stem of a repair plug, a clamping sleeve 11 is provided, said sleeve preferably being of a conical shape.

The device is used in the manner illustrated in Fig. 1, the inserting terminal being forced through the puncture hole in a tire casing from within said casing and grasped by a pliers or other gripping implement and pulled through until the head of the repair plug rests against the inner wall of the tire casing. During the process of inserting the device through the tire casing, the sleeve 11 will be forced downwardly upon the prongs and force the same into more firm clamping engagement with the end of the repair plug. After the sleeve and prongs pass through the puncture hole, the walls of the puncture aperture engage against the stem of the repair plug and retard its passage through the puncture aperture. Tension on the end of the inserting terminal serves to elongate the plug stem at this stage of the operation and causes it to easily pass through the puncture hole until the head of the stem rests against the inner wall of the tire casing. The tension on the end of the terminal is then released and the elasticity of the plug stem tends to restore it to its normal diameter and forces it into firm self-conforming interlocking relation with the walls of the puncture hole. The projecting portion of the plug stem is then severed at a point slightly above the outer surface of the tire casing. The inserting terminal may be applied to other plugs and the repair unit thus be available for further repairs as needed.

In the form of construction illustrated in Fig. 3, the inserting terminal is made in several sections, the gripping portion comprising a cotter pin 15 bent at its lower ends to provide approaching jaws 16 and which are adapted to be forced into clamping engagement with the stem 17 of the puncture plug by means of a locking sleeve 18, preferably of larger diameter at its base. At an intermediate point of the length of the cotter pin, shoulders 19 are formed which serve to retain the locking sleeve in clamping position. These shoulders may be formed prior to locking the terminals upon the plug stem or may be formed after the locking sleeve has been moved to operative position by spreading the upper portion of the cotter pin in order to prevent its being accidentally dislodged from such position. The eye portion 21 of the cotter pin is preferably engaged by a twisted wire 22 having a single wire terminal 23 which is intended to be inserted first through the puncture aperture and which serves as a convenient means for engaging a pliers with the end of the inserting terminal to draw the same through the puncture aperture.

The method of use of the device last described is similar to that of the construction shown in Figs. 1 and 2. However, in the event that it is not desired to apply the inserting terminal to other plugs for future repairs, the same may be discarded as the construction is very light and inexpensive.

The stem of the puncture plug is preferably made of rubber of a high degree of elasticity so that it may be stretched as it is being drawn into position and thus avoid the frictional resistance which would otherwise occur when a soft resilient body is drawn past a roughened surface such as would be present in the irregular inner wall portion of a puncture hole through a tire casing. Instead, however, of having the stem portion of a high degree of elasticity throughout its length the tip portion may be formed of rubber of hard or semi-hard vulcanized rubber formed integrally with the remaining portion of the stem and affording a better base for the attachment of the clamping fingers to the plug stem.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A tire casing repair apparatus forming an individual semi-permanent, self-contained unit, comprising a rubber plug of mushroom-shape having a head section and a stem section and a metal inserting terminal semi-permanently connected with the extreme end only of said stem section, said terminal providing an inserting point adjacent one end and a plurality of outwardly diverging clamping elements with hook shaped jaws adjacent the opposite end and a tapered sleeve engaged over said clamping elements and holding the ends thereof in firm clamping engagement with the end of the stem, the taper and position of said sleeve providing for an increase of clamping engagement with the end of the repair plug as the sleeve is drawn through the puncture aperture in the tire casing.

2. A tire casing repair apparatus forming an individual semi-permanent self-contained unit, comprising a rubber plug of mushroom-shape having a head section and a stem section, and a metal inserting terminal semi-permanently connected with the extreme end only of said stem section, said terminal being formed of a cotter pin with a twisted wire engaged through its eye portion with a single wire inserting extension, the lower ends of said cotter pin being formed to provide outwardly diverging clamping elements with hook-shaped jaws, a tapered sleeve engaged over said diverging portions of said cotter pin, and the intermediate portion of said cotter pin immediately above said locking sleeve being spread open to provide locking shoulders to retain said sleeve in clamping position.

Signed by me this 15th day of July, 1927.

ALBERT H. FISHER.